United States Patent [19]

Harrington et al.

[11] Patent Number: 4,645,716

[45] Date of Patent: Feb. 24, 1987

[54] FLAME SPRAY MATERIAL

[75] Inventors: John H. Harrington, Warwick, N.Y.; Saed Safai, Jupiter, Fla.

[73] Assignee: The Perkin-Elmer Corporation, Norwalk, Conn.

[21] Appl. No.: 721,345

[22] Filed: Apr. 9, 1985

[51] Int. Cl.⁴ .............................................. B05D 1/08
[52] U.S. Cl. ................................ 428/472; 29/156.5 R; 92/213; 92/223; 427/34; 427/423; 428/633; 501/103
[58] Field of Search ................... 427/34, 423; 501/103, 501/134, 152; 428/633, 457, 472; 29/156.5 R; 92/172, 212, 213, 223

[56] References Cited

U.S. PATENT DOCUMENTS 2,978,360  4/1961   Bradstreet et al. .
3,044,968  7/1962   Ichikawa ............................. 501/152
3,145,287  8/1964   Siebein et al. .
3,322,515  5/1967   Dittrich et al. .
3,501,097  3/1970   Daley .
3,607,343  9/1971   Longo .
3,617,358  11/1971  Dittrich .
3,625,717  12/1971  Grubba et al. .
3,645,894  2/1972   Krystyniak .
4,132,916  1/1979   Hueschen et al. .................... 427/34

Primary Examiner—John H. Newsome
Attorney, Agent, or Firm—H. S. Ingham; F. L. Masselle; E. T. Grimes

[57] ABSTRACT

A flame spray material for producing a thermally shock and erosion resistant ceramic coating is comprised of a homogeneous ceramic composition formed of zirconium oxide, yttrium oxide and titanium oxide. The composition is preferably in the form of composite particles each of which contains a plurality of subparticles of each of the oxide constituents bonded with an organic binder.

19 Claims, No Drawings

FLAME SPRAY MATERIAL

This invention relates to a flame spray material which will produce ceramic coatings characterized by a high degree of thermal shock and erosion resistance, and to a process of flame spraying such coatings.

BACKGROUND OF THE INVENTION

Flame spraying involves the heat softening of a heat fusible material, such as a metal or ceramic, and propelling the softened material in particulate form against a surface which is to be coated. The heated particles strike the surface and bond thereto. A conventional flame spray gun is used for the purpose of both heating and propelling the particles. In one type of flame spray gun, the heat fusible material is supplied to the gun in powder form. Such powders are typically comprised of small particles, e.g., below 100 mesh U.S. standard screen size to about 5 microns.

A flame spray gun normally utilizes a combustion or plasma flame to produce the heat for melting of the powder particles. It is recognized by those of skill in the art, however, that other heating means may be used as well, such as electric arcs, resistance heaters or induction heaters, and these may be used alone or in combination with other forms of heaters. In a powder-type combustion flame spray gun, the carrier gas for the powder can be one of the combustion gases or an inert gas such as nitrogen, or it can be simply compressed air. In a plasma spray gun, the primary plasma gas is generally nitrogen or argon. Hydrogen or helium is usually added to the primary gas. The carrier gas in generally the same as the primary plasma gas, although other gases, such as hydrocarbons, may be used in certain situations.

The material alternatively may be fed into a heating zone in the form of a rod or wire. In the wire type flame spray gun, the rod or wire of the material to be sprayed is fed into the heating zone formed by a flame of some type, where it is melted or at least heat-softened and atomized, usually by blast gas, and thence propelled in finely divided form onto the surface to be coated. The rod or wire may be conventionally formed as by drawing, or may be formed by sintering together finely divided material, or by bonding together finely divided material by means of an organic binder or other suitable binder which disintegrates in the heat of the heating zone, thereby releasing the material to be sprayed in finely divided form.

Flame sprayed ceramic coatings containing refractories such as zirconium oxide are often used for thermal barrier protection of metal components, such as in gas turbine engines. The zirconium oxide may contain some hafnium oxide and incidental impurities. It typically is stabilized with calcium oxide or yttrium oxide or may be in the form of magnesium zirconate. However, ceramic coatings including these refractories generally are susceptible to cracking and spalling under severe thermal cycling or thermal shock conditions. One reason for this cracking and spalling is that the coefficient of thermal expansion of a ceramic coating is low compared to the metal substrate, resulting in high stresses due to the expansion mismatch.

A particularly severe condition is presented to ceramic coatings on the top of pistons ("piston domes") improving efficiency of internal combustion engines. Such application is disclosed in U.S. Pat. No. 2,978,360 for flame sprayed ceramic coatings categorized as combustion catalysts. However, to date a fully satisfactory coating for this type of environment has not been achieved.

In U.S. Pat. No. 3,625,717 certain flame spray ceramic compositions are taught which have capability under impact and debilitating environments calling for extremely good wear resistance. These prior art ceramic compositions specifically comprise a matrix of aluminum oxide, chromium oxide or stabilized zirconium oxide with an additional phase formed from the matrix oxide with simultaneous additives of iron oxide and titanium oxide.

U.S. Pat. No. 3,645,894 describes plasma spraying spherical agglomerate particles formed by spray drying certain two or three-component metallic oxide powders. The three component particles consist of a first metallic oxide powder characterized by oxygen-ion conductivity upon stabilization, a stabilizing metallic oxide powder and a metallic oxide powder selected from a group consisting of nine oxides. The first constituent may be zirconia or thoria and the stabilizing oxide may be calcium oxide, yttrium oxide, ytterbium oxide or a mixture of rare earth oxides. The group of nine oxides broadly includes titanium oxide, but of a list of 18 examples having more than two components, titanium oxide is entered only once, without elaboration, and is present in combination with a larger portion of iron oxide. The patent does not mention properties such as thermal shock resistance.

U.S. Pat. No. 3,607,343 teaches flame spraying a flame spray powder, the individual particles of which are clad with a fluxing ceramic bonded to the surface thereof. These flame spray powder particles, onto which fluxing ceramic is bonded, are of conventional size and may be any conventional or known flame spray material including metals and ceramic of which zirconium oxide is one example. Fluxing ceramics are certain ceramics having the property of wetting or dissolving other oxide ceramics. Titanium oxide is one example of a number of such fluxing ceramics.

Another known composition is a flame spray powder of zirconium oxide containing calcium oxide and titanium oxide. Coatings of this composition have favorable properties including some thermal shock resistance but the coatings have failed under conditions of extensive use.

Zirconium oxide powder stabilized with yttrium oxide has been mixed with titanium oxide powder and deposited with a plasma gun to produce coatings having high thermal emittance for an x-ray tube, as disclosed in U.S. Pat. No. 4,132,916. A mixture is necessary for this purpose, as distinct from a composite powder, in order that the sprayed titanium oxide retain its identity to contribute a black color to the coating.

Flame sprayed ceramic coatings usually are not fully dense, having some porosity typically up to about 20% depending on composition, powder size distribution, flame spray method and parameters. The high porosity coatings are capable of having a higher degree of resistance to thermal stress than the denser coatings. However, a more porous coating will have lower resistance to erosion and other wear conditions that exist in the environments where such coatings are used. Many high temperature applications also require resistance to erosion by particles and debris.

In view of the foregoing, it is a primary object of the present invention to provide a flame spray material for producing a ceramic coating characterized by a high degree of thermal shock and erosion resistance.

It is a further object of this invention to provide a flame sprayed ceramic coating suitable for use under thermal stress conditions.

It is another object of this invention to provide a flame spray material for producing a ceramic coating that has both high density and a high degree of thermal shock resistance.

BRIEF DESCRIPTION OF THE INVENTION

The foregoing and other objects of the present invention are achieved by a flame spray material for producing a ceramic coating characterized by resistance to erosion, thermal cycling and thermal shock. The flame spray material according to the present invention comprises a homogeneous composition of zirconium oxide, yttrium oxide, titanium oxide and, optionally, an organic binder.

DETAILED DESCRIPTION OF THE INVENTION

According to the present invention, a ceramic composition has been developed for flame spraying onto substrates by conventional flame spray equipment. The coating produced by the flame spraying of the novel ceramic powder is highly resistant to thermal cycling and thermal shock compared to prior art flame sprayed ceramic coatings. Dense coatings of the composition also have excellent resistance to erosion and wear.

The flame spray material comprises a homogeneous ceramic composition consisting of zirconium oxide, yttrium oxide, titanium oxide, optionally an organic binder in an amount up to about 10 percent, and incidential impurities in a amount up to about 1 percent. The yttrium oxide is present in an amount between about 2 and 40 percent and preferably between about 5 and 25 percent by weight of the total of the zirconium oxide, yttrium oxide and titanium oxide. The titanium oxide is present in an amount between about 6 and 30 percent and preferably between about 8 and 25 percent by weight of the total of the zirconium oxide, yttrium oxide and titanium oxide.

The flame spray material may be in any form that is suitable for flame spraying such as a rod but is preferably in the form of a powder. The powder should have conventional size limits, generally between about −100 mesh (U.S. standard screen size) and +5 microns and preferably between about −200 mesh and +25 microns.

As used herein in respect to the flame spray material, the term "homogeneous" means that there is a plurality of subparticles of each of the individual oxide constituents forming the structure of the ceramic composition, the subparticles being less than 25 microns in size and preferably less than 10 microns. In one embodiment the constituents may be fully in solution together on a molecular scale. Where the flame spray material is a powder, the subparticle of the individual constituents are substantially smaller than the average size of the powder particles, for example less than one third of the size. Furthermore, it is important that no two of the powders be fused or reacted together before combination with the third constituent, for example, the subparticles of zirconium oxide must not be previously stabilized with the yttrium oxide.

It is speculated that the reason for the requirement that the composition be homogeneous and that the zirconia be unstabilized is that the crystalline structures in the flame sprayed ceramic coatings are influenced critically by the chemical compositions on a microscopic or even molecular scale and, therefore, the coating compositions on such a scale should contain significant amounts of all the oxide constituents in solution. For example, where a powder is formed by merely bonding at least one of the constituents onto the surfaces of individual larger core particle of another constituent to form a powder of clad particles, which powder is not homogenous in accordance with the present invention, the constituent clad on the surface apparently does not sufficiently diffuse into the core particle during flame spraying. Similarly, in powder formed with prestabilized zirconia, apparently there is insufficient combination with the third constituent to form the thermally shock resistant coating.

The homogeneous method composition may be formed by any known or desired method. For example, the powder may be made by the conventional method of fusing or sintering together the three constituent oxides, and then crushing and screening the fused product to form powder of the proper size. A preferred method is to fabricate the powder in the form of composite particles each of which contains a plurality of subparticles of each of the three oxide constituents bonded with an organic binder which may be present in an amount up to 10 percent and preferably at least 0.2 percent by weight. Such powder may be produced, for example, by a spray drier process such as described in U.S. Pat. No. 3,617,358. Any known or desired organic binder such as listed in that referenced patent may be used. Generally the binder will burn or evaporate from the material in the heat of the flame spray process resulting in a coating which is free of the organic constituents and has the desired characteristic of thermal shock resistance.

Another method for preparing the powder is to form composite particles with a spray drier as above, feed the particles through a zone of high temperature to fuse the particles, allow the particle to cool and solidify individually, and collect the powder particles so formed. The zone of high temperature may be created with an induction plasma, a plasma spray gun through which powder may be fed in the ordinary manner, or the like. The powder collected is comprises of solid, fused, substantially spherical particles that are homogeneous in accordance with the present invention.

The zirconium oxide constituent must be used in its unstabilized form when initially combined with the yttrium oxide and titanium oxide. Also, unless highly purified, zirconium oxide typically may contain a small proportion of hafnium oxide which has similar physical and chemical characteristics and, except for certain nuclear applications, does not substantially change the physical characteristics of coatings. Hafnium oxide may be present, for example, in an amount up to about 10 percent by weight of the total of the zirconium oxide and hafnium oxide. The term "zirconium oxide" as used herein and in the claims is intended to include zirconium oxide that may contain such a proportion of hafnium oxide.

Incidental impurities may be present in an amount up to about 1 percent be weight. However, if oxide impurities are present in significant excess of this amount, the resulting coating has inferior thermal shock resistance. This is particularly true of iron oxide where tests have shown far inferior thermal shock resistance compared to coatings produced with the composition of the present invention.

While the homogeneous ceramic composition of the present invention preferably is used as is, the same optionally may be combined with other flame spray materials such as another ceramic composition or a metal. For example, where the material is a powder the homogeneous ceramic composition may be blended with another flame spray ceramic powder having desired characteristics, such as aluminum oxide powder which provides wear resistance. A flame sprayed coating of such a powder blend will have the combined properties of wear resistance and thermal shock resistance. Where the second powder is a metal, the ceramic coating will be a cermet with properties enhanced by the metal.

It is highly desirable that the coatings be applied over an intermediate layer of metallic bond coat in order to achieve optimum bond strength and thermal stability. The bond coat may for example, be flame sprayed with an alloy of nickel or cobalt containing chromium and/or aluminum, but preferably the starting powder is a nickel-aluminum composite of the type disclosed in U.S. Pat. No. 3,322,515. As an example a powder formed by nickel-20 chromium alloy core is clad with about 5% of fine aluminum particles using an organic binder as described in said U.S. patent. This powder is flame sprayed on a substrate prepared by rough grit blasting to a thickness between about 0.003 inches and 0.010 inches prior to coating with a homogeneous ceramic composition of the present invention.

A coating system of the present invention may utilize further intermediate layers of blended metal and ceramic of the present invention, or graded layers as desired or known in the art, to relieve stress in a thermal environment.

The coatings according to the present invention should have a thickness between about 0.002 and 0.10 inch or even thicker, but preferably between about 0.01 and 0.05 inches. They may be used wherever it is desirable to form a thermally insulating barrier to protect a surface against the effects of high temperature, especially where conditions for erosion or wear are also present. Typical applications include gas turbine burner cans, shrouds and other turbine engine components. Other areas are rocket thrust chambers and nozzles, furnace chambers and stacks, fluid bed coal gasifiers, power plant heating surfaces, and piston domes, cylinder heads and cylinder walls of internal combustion engines, especially adiabatic diesel engines. Coatings of the present invention have demonstrated excellent sliding wear characteristics and low friction when applied to piston ring surfaces.

EXAMPLE 1

An 8172 gram quantity of zirconium oxide ($ZrO_2$) powder, of particles size less than 10 microns and approximately 3 microns average, was blended with 1135 grams of yttrium oxide ($Y_2O_3$) powder of size less than 5 microns and approximately 1 micron average, and 2043 grams of titanium oxide ($TiO_2$) of size less than 5 microns size and approximately 0.3 micron average. A binder of sodium carboxyl methyl cellulose was dissolved in water to form a concentrated solution containing 113.5 grams of binder and 4653.5 grams of water.

A slip was formulated according to the following table, using the prepared concentrations described above, where applicable, and in the proportions indicated:

TABLE 1

| Total Added | Addition | Wt Solids | Wt. Liquid |
|---|---|---|---|
| 11,350 g | Ceramic Blend | 11,350 g | |
| 1,135 g | Binder solution at 10% solids | 113.5 g | 1,021.5 g |
| 3,632 g | Water | | 3,632 g |

In blending the ingredients to form the slip, all liquids and solutions were first weighted into the mixing tank with the mixer running. The dry powder was then fed into the mixing tank such that deflocculation occurred immediately, and after a short mixing time, the slip was uniform in consistency. The slip was spray dried as described in U.S. Pat. No. 3,617,358. Heated air was introduced in a cyclonic flow pattern at the top of a vertical straight-cylindrical drying chamber. This slip was atomized into droplets near the bottom of the drying chamber and directed upwards along the vertical centerline by a blast of compressed air.

The slip was fed by pumping into the atomizing nozzle from which the atomized slip was propelled through the drying chamber, to be finally collected in chamber and cyclone collectors as a dry powder. The powder collected in the spray dryer chamber was screened with a 200 mesh screen to yield a free flowing powder having a size in the range −200 mesh +25 microns. The composition was, by weight, 72% zirconium oxide, 10% yttrium oxide and 18% titanium oxide, based on the total of these oxides.

The powder was flame sprayed with a standard plasma flame spray gun of the general type described in U.S. Pat. No. 3,145,287 and sold by METCO Inc., Westbury, N.Y., under the trademark METCO Type 7 MB, using a GH nozzle with No. 2 powder port, and a powder feeder of the type described in U.S. Pat. No. 3,501,097 and sold under the trademark METCO Type 3MP. Parameters were argon plasma gas at 100 p.s.i. and 25 CFH, 500 amperes, 75 volts, carrier gas 15 CFH, powder feed rate 3 pounds per hour, spray distance between 2 and 2½ inches, and air at 70 p.s.i. from two jets aside the nozzle intersecting at about 2½ to 3 inches distance. Coating hardness averaged Rc 54. Deposit efficiency was 58%. Coatings of up to about 01.8 inch thickness were sprayed onto nickel alloy substrates prepared with a bond coat of flame sprayed aluminum (5 weight percent) nickel chromium alloy powder of the type prepared with a resin binder as described in U.S. Pat. No. 3,322,515. Metallographic examination of the coating revealed a high coating density (porosity about ½%) and an absence of unmelted particles.

Coatings showed excellent resistance to oxidation in five hour exposure at 1100° C., and resistance to a molten mixture of sodium sulfate and sodium chloride at 750° C. for six hours.

EXAMPLE 2

A 1816 gram quantity of zirconium oxide was blended with 253 grams of yttrium oxide and 455 grams of titanium oxide in a V-blender of 2 liter size for about 30 minutes. 340 grams of a phenolic varnish diluted with about 20% thinner (by volume) was then gradually added during further blending until an agglomerated powder was formed. The powder was warmed in an oven to dry for about one hour, after which it was screened through a 200 mesh screen. Composite powder of the same composition as Example 1, except binder, was thereby produced. It was flame sprayed in the same manner, producing a dense coating except hardness was Rc 33.

EXAMPLE 3

A known type of coating was produced from a commercial flame spray powder of zirconium oxide sold under the trademark METCO 201-NS-1 (herein designated "ZC"). This powder is a composite powder of zirconium oxide and 8 weight percent of −10 micron calcium carbonate, produced with a spray dryer in a manner similar to example 1. During flame spraying the carbonate decomposes releasing the $CO_2$ gas, and fused zirconium oxide stabilized with 5 weight percent calcium oxide is deposited. Such a coating is used typically for thermal barrier purposes. Coatings were sprayed having about 1% porosity.

Another commercial powder was flame sprayed to produce a dense coating, the powder being a spray dried composite of zirconium oxide and 20 weight percent yttrium oxide sold under the trademark METCO 202-NS (herein designated "ZY").

A third powder was prepared by the spray drying method of Example 1, to form a composite powder of zirconium oxide, calcium carbonate and titanium oxide ("ZCT"). The coatings contained 3 weight percent calcium oxide and 22 weight percent titanium oxide, and had about 1% porosity.

A fourth powder ("ZYTI") was prepared using a composition in which 202 grams of minus 5 micron iron oxide ($Fe_2O_3$) powder was added to the blend of constituents used in Example 2. The powder was produced with the V-blender as in example 2, consisting of zirconium oxide, 9 weight percent yttrium oxide, 17 weight percent titanium oxide and 7 percent iron oxide. This powder had a composition similar to that taught in U.S. Pat. No. 3,625,717.

A fifth powder was prepared by cladding minus 5 micron titanium oxide powder onto −170 mesh +15 micron core powder of stabilized zirconium oxide using a binder of poly vinyl propylene. The core powder was produced by fusing and crushing zirconium oxide and 8 weight percent yttrium oxide. The cladding method was similar to that taught in U.S. Pat. No. 3,607,343. The clad powder was screened to −200 mesh +25 microns. A coating flame sprayed with the clad powder contained about 6% porosity.

A sixth powder ("ZY-T") was prepared with subparticles of zirconium oxide prestablized with 12 weight percent yttrium oxide and having an average size of about 0.1 microns. These subparticles were blended with 18 weight percent of the 0.3 micron size titanium oxide used in Examples 1 and 2. The powder was produced with the V-blender as in Example 2, consisting of prestabilized zirconium oxide, 9.8 weight percent yttrium oxide and 18 weight percent titanium oxide.

EXAMPLE 4

The powder of Example 1 (zirconium oxide, yttrium oxide, titanium oxide) was plasma flame sprayed with alternative parameters using the same type of spray gun and powder feeder as in Example 1. The alternative parameters were argon plasma gas at 100 p.s.i. and 75 CFH flow, hydrogen secondary gas at 50 p.s.i. and 15 CFH, 600 amperes, 65 volts, carrier gas 15 CFH, powder feed rate 3 pounds per hour, spray distance 3 inches, and air at 70 p.s.i. from two jets aside the nozzle intersecting at 3 inches distance. The coatings were similar to those of Example 1.

A coating of Example 4 has performed very well in initial testing on a piston dome in a truck-type diesel engine. The coating was about 0.020 inch thick on a 0.005 inch bond coat sprayed from composite nickel alloy and aluminum powder (as described hereinabove). The cast iron piston was about 8 inches in diameter.

EXAMPLE 5

The powder of Example 1 was blended with 50% by weight of aluminum oxide of size −25 microns +5 microns. Coatings flame sprayed in the manner of Example 4 had a hardness of about Rc 55.

The thermal shock resistance of each of the coatings of Examples 1, 2 and 3, flame sprayed to about 0.030 inches thick on a nickel alloy substrate, was tested by heating the coating in a furnace to a specified temperature and quenching it into water at room temperature. Coating hardness was measured before testing and after each quench. This heating and quenching was done for 600° C. and was repeated for successively higher temperatures in increments of about 100° C. or 200° C. Coating hardness generally remained approximately constant after each quench until a critical temperature was reached where the coating hardness after quench was substantially decreased. Metallographic examinations indicated that the decrease reflected internal cracking and, therefore, failure of the coating. A high failure temperature corresponds to high thermal shock resistance. The failure temperature for the various coatings is given in Table II.

TABLE II

| Composition | R.C. Hardness Before Failure | After Failure | Change | Temperature |
|---|---|---|---|---|
| (1) Example 1 | 54 | (no failure) | — | 1300° C. (1) |
| (2) Example 2 | 33 | (no failure) | — | 1000° C. (2) |
| (3) ZC (3) | 49 | 29 | −20 | 740° C. |
| (4) ZY (3) | 23 | 16 | −7 | 600° C. |
| (5) ZCT (3) | 56 | 35 | −21 | 900° C. |
| (6) ZYTI (3) | 35 | 18 | −17 | 800° C. |
| (7) Clad Powder (3) | 37 | 31 | −7 | 700° C. |
| (8) ZY-T (3) | 27 | 18 | −9 | 700–800° C. |

Notes:
(1) Highest temperature tested: Substrate melted.
(2) Highest temperature tested.
(3) Example 3.

Particle erosion tests were carried out on the coatings of Examples 4 and 5 in comparison with coatings indicated in Example 3. Aluminum oxide abrasive powder of size −270 mesh +15 microns was fed through a 0.090 inch I.D. nozzle at a rate of 130 gm/min under air pressure of 30 p.s.i. This was blasted at a coating specimen located about 4 inches from the nozzle at an angle of 45° for 2 minutes. The degree of erosion was calculated as volume loss of coating material (in $cm^3$) per gram of abrasive used.

The erosion tests were made at high temperature. A pair of oxygen-propane flames were set to straddle the abrasive while aimed at the specimen. Each test specimen was preheated to about 1800° F. before the abrasive blast was started, and the flames were continued during the blast. Results are given in Table III.

TABLE III

| Composition | Hot Erosion Rate (10⁻⁴ cm³ coating loss/gm abrasive) |
| --- | --- |
| (1) Example 4 | 0.80 |
| (2) Example 5 | 0.28 |
| (3) ZY (Example 3) | 1.95 |

While the invention has been described above in detail with reference to specific embodiments, various changes and modifications which fall within the spirit of the invention and scope of the appended claims will become apparent to those skilled in this art. The invention is therefore only intended to be limited by the appended claims or their equivalents.

What is claimed is:

1. A flame spray material characterized by ability to produce thermally shock and erosion resistant coatings comprising a homogeneous ceramic composition consisting of:
   zirconium oxide containing up to about 10 percent of hafnium oxide based on the total weight of the zirconium oxide and hafnium oxide;
   yttrium oxide;
   titanium oxide;
   organic binder in an amount up to about 10 percent by weight of the ceramic composition; and
   incidental impurities in an amount up to about 1 percent by weight of the ceramic composition;
   the yttrium oxide being present in an amount between about 2 and 40 percent based on the total weight of the zirconium oxide, hafnium oxide, yttrium oxide and titanium oxide;
   the titanium oxide being present in an amount between about 6 and 30 percent based on the total weight of the zirconium oxide, hafnium oxide, yttrium oxide and titanium oxide; and
   the zirconium oxide being unstabilized when initially combined with the yttrium oxide and titanium oxide.

2. Flame spray material according to claim 1 in which the homogeneous ceramic composition is in the form of powder having a size between about −100 mesh and +5 microns.

3. Flame spray material according to claim 2 in which the powder is in the form of composite particles each of which comprises a plurality of subparticles of unstabilized zirconium oxide, yttrium oxide and titanium oxide, the subparticles having a size less than about 25 microns.

4. Flame spray powder according to claim 3 in which the subparticles have a size less than about 10 microns.

5. Flame spray material according to claim 3 in which the subparticles are bonded with organic binder in an amount between about 0.2 and 10 percent by weight of the composition.

6. A flame spray powder of size between about −200 mesh and +25 microns comprising a homogeneous ceramic composition consisting of:
   subparticles of unstabilized zirconium oxide containing up to about 10 percent by weight of hafnium oxide based on the total weight of the zirconium oxide and hafnium oxide;
   subparticles of yttrium oxide;
   subparticles of titanium oxide;
   organic binder in an amount between about 0.2 percent and 10 percent by weight of the ceramic composition; and
   incidental impurities in an amount up to about 1 percent by weight of the ceramic composition;
   the subparticles having a size less than about 10 microns;
   the yttrium oxide being present in an amount between about 5 and 25 percent by weight of the total of the zirconium oxide, hafnium oxide, yttrium oxide and titanium oxide;
   the titanium oxide being present in an amount between about 8 and 25 percent by weight of the total of the zirconium oxide, hafnium oxide, yttrium oxide and titanium oxide.

7. A process for producing a thermally shock and erosion resistant ceramic coating comprising flame spraying a flame spray material comprising a homogeneous ceramic composition consisting of:
   zirconium oxide containing up to about 10 percent of hafnium oxide based on the total weight of the zirconium oxide and hafnium oxide;
   yttrium oxide;
   titanium oxide; and
   an organic binder in an amount up to about 10 percent by weight of the composition;
   incidental impurities in an amount up to about 1 percent by weight of the composition;
   the yttrium oxide being present in an amount between about 2 and 40 percent based on the total weight of the zirconium oxide, hafnium oxide, yttrium oxide and titanium oxide;
   the titanium oxide being present in an amount between about 6 and 30 percent based on the total weight of the zirconium oxide, hafnium oxide, yttrium oxide and titanium oxide; and
   the zirconium oxide being unstabilized when initially combined with the yttrium oxide and titanium oxide.

8. A process for producing a thermally shock and erosion resistant ceramic coating comprising flame spraying a flame spray material comprising a homogeneous ceramic composition consisting of:
   zirconium oxide containing up to about 10 percent of hafnium oxide based on the total weight of the zirconium oxide and hafnium oxide;
   yttrium oxide;
   titanium oxide; and
   incidental impurities in an amount up to about 1 percent by weight of the composition;
   the yttrium oxide being present in an amount between about 2 and 40 percent based on the total weight of the zirconium oxide, hafnium oxide, yttrium oxide and titanium oxide;
   the zirconium oxide being unstabilized when initially combined with the yttrium oxide and titanium oxide.

9. Process according to claim 7 or 8 in which the powder is in the form of composite particles each of which comprises a plurality of subparticles each of unstabilized zirconium oxide, yttrium oxide and titanium oxide, the subparticles having a size less than about 10 microns.

10. An article of manufacture comprising a substrate formed of a first metal selected from the group consisting of nickel, iron, cobalt and alloys thereof and a homogeneous ceramic composition coating formed thereon by the process of claim 7 or 8.

11. An article according to claim 10 further comprising an intermediate layer situated between the substrate and the ceramic coating, the intermediate layer being applied prior to forming the ceramic coating by flame spraying a coating material comprising a second metal selected from the group consisting of nickel, iron, cobalt and alloys thereof.

12. An article according to claim 11 in which the coating material additionally comprises aluminum.

13. A piston for an internal combustion engine in which the dome of the piston has a homogeneous, ceramic composition coated thereon by the process of claim 7 or 8.

14. A piston according to claim 13 wherein an intermediate layer of nickel alloy is applied by flame spraying prior to coating the homogeneous ceramic composition thereon.

15. A flame spray material characterized by ability to produce thermally shock and erosion resistant coatings comprising a homogeneous ceramic composition consisting of:
zirconium oxide containing up to about 10 percent of hafnium oxide based on the total weight of the zirconium oxide and hafnium oxide;
yttrium oxide;
titanium oxide; and
incidental impurities in an amount up to about 1 percent by weight of the ceramic composition;
the yttrium oxide being present in an amount between about 2 and 40 percent based on the total weight of the zirconium oxide, hafnium oxide, yttrium oxide and titanium oxide;
the titanium oxide being present in an amount between about 6 and 30 percent based on the total weight of the zirconium oxide, hafnium oxide, yttrium oxide and titanium oxide; and
the zirconium oxide being unstabilized when initially combined with the yttrium oxide and titanium oxide.

16. Flame spray material according to claim 15 in which the homogeneous ceramic composition is in the form of powder having a size between about $-100$ mesh and $+50$ microns.

17. Flame spray material according to claim 16 in which the powder is in the form of composite particles each of which comprises a plurality of sintered subparticles of unstabilized zirconium oxide, yttrium oxide and titanium oxide, the subparticles having a size less than about 25 microns.

18. Flame spray powder according to claim 17 in which the subparticles have a size less than about 10 microns.

19. Flame spray material according to claim 16 in which the powder is in the form of fused particles.

* * * * *